United States Patent
Fry

(10) Patent No.: US 7,797,337 B2
(45) Date of Patent: Sep. 14, 2010

(54) METHODS, SYSTEMS, AND COMPUTER PROGRAM PRODUCTS FOR AUTOMATICALLY ASSOCIATING DATA WITH A RESOURCE AS METADATA BASED ON A CHARACTERISTIC OF THE RESOURCE

(75) Inventor: Jared S. Fry, Boston, MA (US)

(73) Assignee: Scenera Technologies, LLC, Portsmouth, NH (US)

( * ) Notice: Subject to any disclaimer, the term of this patent is extended or adjusted under 35 U.S.C. 154(b) by 567 days.

(21) Appl. No.: 11/238,453

(22) Filed: Sep. 29, 2005

(65) Prior Publication Data

US 2007/0073688 A1    Mar. 29, 2007

(51) Int. Cl.
    *G06F 17/30*    (2006.01)
(52) U.S. Cl. ...................................... 707/776
(58) Field of Classification Search ........................ None
    See application file for complete search history.

(56) References Cited

U.S. PATENT DOCUMENTS

| | | | |
|---|---|---|---|
| 5,301,268 A | 4/1994 | Takeda | |
| 5,398,312 A | 3/1995 | Hoffmann | |
| 5,428,734 A | 6/1995 | Haynes et al. | |
| 5,878,410 A | 3/1999 | Zbikowski et al. | |
| 5,899,995 A | 5/1999 | Millier et al. | |
| 5,920,861 A * | 7/1999 | Hall et al. | 707/9 |
| 5,980,096 A | 11/1999 | Thalhammer-Reyero | |
| 6,002,402 A | 12/1999 | Schacher | |
| 6,009,442 A | 12/1999 | Chen et al. | |
| 6,035,323 A | 3/2000 | Narayen et al. | |
| 6,151,624 A * | 11/2000 | Teare et al. | 709/217 |
| 6,243,724 B1 | 6/2001 | Mander et al. | |
| 6,259,448 B1 | 7/2001 | McNally et al. | |
| 6,353,823 B1 | 3/2002 | Kumar | |
| 6,418,448 B1 | 7/2002 | Sarkar | |
| 6,466,238 B1 | 10/2002 | Berry et al. | |
| 6,501,911 B1 | 12/2002 | Malloy Desormeaux | |
| 6,505,003 B1 | 1/2003 | Malloy Desormeaux | |
| 6,510,434 B1 | 1/2003 | Anderson et al. | |
| 6,516,154 B1 | 2/2003 | Parulski et al. | |
| 6,582,474 B2 | 6/2003 | LaMarca et al. | |
| 6,613,101 B2 | 9/2003 | Mander et al. | |

(Continued)

OTHER PUBLICATIONS

Finnie, "The Lowdown on Longhorn," TechWeb.com, pp. 1-5 (May 2, 2005).

(Continued)

*Primary Examiner*—Neveen Abel Jalil
*Assistant Examiner*—Bai D Vu

(57) ABSTRACT

Methods, systems, and computer program products for automatically associating data with a resource as metadata based on a characteristic of the resource are disclosed. According to one method, a metadata association rule is defined for a metadata associator. The metadata association rule specifies a data value to be associated with a resource as metadata based on a characteristic of the resource. A user interface is provided for associating at least one resource with a metadata associator. In response to a resource being associated with the metadata associator via a user interface, the data value is associated with the resource as metadata based on the metadata association rule. The specified data value may be defined prior to the resource being associated with the metadata and independently of both the resource and a file system with which the resource is associated.

51 Claims, 5 Drawing Sheets

U.S. PATENT DOCUMENTS

| | | |
|---|---|---|
| 6,741,994 B1 | 5/2004 | Kang et al. |
| 6,757,684 B2 | 6/2004 | Svendsen et al. |
| 6,760,884 B1 | 7/2004 | Vertelney et al. |
| 6,810,404 B1 | 10/2004 | Ferguson et al. |
| 6,820,094 B1 | 11/2004 | Ferguson et al. |
| 6,877,138 B2 | 4/2005 | Fitzpatrick et al. |
| 7,162,488 B2* | 1/2007 | DeVorchik et al. .......... 707/102 |
| 7,171,468 B2 | 1/2007 | Yeung et al. |
| 7,269,612 B2* | 9/2007 | Devarakonda et al. ...... 707/205 |
| 7,386,532 B2 | 6/2008 | Kiessig et al. |
| 2002/0016800 A1 | 2/2002 | Spivak et al. |
| 2002/0065741 A1 | 5/2002 | Baum |
| 2002/0065844 A1* | 5/2002 | Robinson et al. ............ 707/500 |
| 2002/0073104 A1 | 6/2002 | Nunez |
| 2002/0087601 A1 | 7/2002 | Anderson et al. |
| 2002/0093678 A1 | 7/2002 | Skidgel et al. |
| 2002/0135801 A1 | 9/2002 | Tessman et al. |
| 2003/0034892 A1 | 2/2003 | Light et al. |
| 2003/0078968 A1 | 4/2003 | Needham et al. |
| 2003/0078987 A1* | 4/2003 | Serebrennikov ............. 709/217 |
| 2003/0087601 A1 | 5/2003 | Agam et al. |
| 2003/0105795 A1 | 6/2003 | Anderson et al. |
| 2003/0105831 A1 | 6/2003 | O'Kane |
| 2003/0110188 A1 | 6/2003 | Howard et al. |
| 2003/0131002 A1 | 7/2003 | Gennetten et al. |
| 2003/0131013 A1 | 7/2003 | Pope et al. |
| 2003/0154178 A1 | 8/2003 | McIntyre et al. |
| 2003/0208499 A1 | 11/2003 | Bigwood et al. |
| 2004/0006575 A1 | 1/2004 | Visharam et al. |
| 2004/0019658 A1 | 1/2004 | Plastina et al. |
| 2004/0027382 A1 | 2/2004 | Kuehn et al. |
| 2004/0096110 A1 | 5/2004 | Yogeshwar et al. |
| 2004/0111728 A1 | 6/2004 | Schwalm |
| 2004/0133589 A1 | 7/2004 | Kiessig et al. |
| 2004/0153467 A1 | 8/2004 | Conover et al. |
| 2004/0168118 A1 | 8/2004 | Wong et al. |
| 2004/0172241 A1 | 9/2004 | Mahe et al. |
| 2004/0177319 A1* | 9/2004 | Horn ...................... 715/501.1 |
| 2004/0210552 A1* | 10/2004 | Friedman et al. ............... 707/1 |
| 2004/0210946 A1 | 10/2004 | Shin |
| 2004/0220926 A1* | 11/2004 | Lamkin et al. ................. 707/3 |
| 2004/0250215 A1 | 12/2004 | Chen et al. |
| 2004/0260702 A1 | 12/2004 | Cragun et al. |
| 2005/0015391 A1 | 1/2005 | Pohlan |
| 2005/0044089 A1 | 2/2005 | Wu et al. |
| 2005/0050537 A1 | 3/2005 | Thompson et al. |
| 2005/0060653 A1 | 3/2005 | Fukase et al. |
| 2005/0063083 A1 | 3/2005 | Dart et al. |
| 2005/0071865 A1 | 3/2005 | Martins |
| 2005/0080802 A1 | 4/2005 | Cras et al. |
| 2005/0091184 A1 | 4/2005 | Seshadri et al. |
| 2005/0091285 A1 | 4/2005 | Krishnan et al. |
| 2005/0097120 A1 | 5/2005 | Cooper et al. |
| 2005/0114356 A1 | 5/2005 | Bhatti |
| 2005/0114381 A1 | 5/2005 | Borthakur et al. |
| 2005/0120021 A1 | 6/2005 | Tang et al. |
| 2005/0131871 A1 | 6/2005 | Howard et al. |
| 2005/0166159 A1 | 7/2005 | Mondry et al. |
| 2005/0177796 A1 | 8/2005 | Takahashi |
| 2006/0031486 A1 | 2/2006 | Miner |
| 2007/0067290 A1* | 3/2007 | Makela ......................... 707/6 |
| 2008/0222170 A1 | 9/2008 | Farnham et al. |

OTHER PUBLICATIONS

Mackey, "Longhorn So Far," http://arstechnica.com/journals/microsoft.ars/2005/5/2/194, p. 1 (May 2, 2005).

Spanbauer, "Longhorn Preview," PC World, pp. 1-5 (Copyright 2005).

Rector, "Chapter 4: Storage (Introducing Longhorn for Developers)," Microsoft.com, pp. 1-19 (Jan. 2004).

"An Opinion," http://anopinion.net/posts/248.aspx, pp. 1-30 (Publication Date Unknown).

"An Opinion," http://anopinion.net/posts/241.aspx, pp. 1-33 (Publication Date Unknown).

"More Effective at Work and Home," http://www.microsoft.com/windows/longhorn/infomanagement.mspx, Microsoft Windows, pp. 1-3 (Published Apr. 25, 2005).

Commonly-assigned, co-pending U.S. patent application for "Methods, Systems, and Computer Program Products for Resource-to-Resource Metadata Association" (serial No. not yet assigned).

Commonly-assigned, co-pending U.S. patent application for "User Interfaces and Related Methods, Systems, and Computer Program Products for Automatically Associating Data with a Resource as Metadata" (serial No. not yet assigned).

* cited by examiner

METHODS, SYSTEMS, AND COMPUTER PROGRAM PRODUCTS FOR AUTOMATICALLY ASSOCIATING DATA WITH A RESOURCE AS METADATA BASED ON A CHARACTERISTIC OF THE RESOURCE

RELATED APPLICATIONS

This application is related to a commonly-assigned, co-pending U.S. patent application entitled, "Methods, Systems, and Computer Program Products for Resource-to-Resource Metadata Association" Ser. No. 11/239,276 and a commonly-assigned, co-pending U.S. patent application entitled, "User Interfaces and Related Methods, Systems, and Computer Program Products for Automatically Associating Data with a Resource as Metadata" Ser. No. 11/238,708, both filed on even date herewith, the disclosure of each of which is incorporated herein by reference in its entirety.

TECHNICAL FIELD

The subject matter described herein relates to methods, systems, and computer program products for automatically associating data with a resource as metadata. More particularly, the subject matter described herein relates to methods, systems, and computer program products for automatically associating data with a resource as metadata based on a characteristic of the resource.

BACKGROUND ART

In computer file systems, files are used to store data created by users, software applications, and devices. In addition to user-created content, a computer file may be associated with descriptive information regarding the contents or other aspects of the file. This descriptive information is referred to as metadata. In some instances, metadata is stored in the file. In other instances, metadata is stored outside of the file but is linked to the file.

Some application programs allow users to manually create and associate metadata with a file. For example, digital image organization programs sold with digital cameras may allow a user to manually enter captions to be stored and/or displayed with an image. While such manual metadata creation tools are useful, they require unnecessary time and labor on the part of the end user, because the end user is required to manually input the metadata for each resource.

Some current computer operating systems include limited functionality for automatically associating file system information with files. For example, the Windows® 98 and Windows® 2000 operating systems automatically associate a file's location in a file directory tree with the file in response to the file being stored in a particular directory. However, the Windows® 98 and Windows® 2000 operating systems do not allow a user to define his or her own metadata that is automatically associated with the file. In addition, the Windows® 98 and Windows® 2000 operating systems do not allow metadata to be selectively associated with a file based on a characteristic of the file. For example, it may be desirable to automatically associate different metadata with image files and documents stored in the same folder. Windows® 98 and Windows® 2000 would treat all files stored in the folder identically by associating the folder's location in the directory tree with a location tag in each file.

Newer operating systems include file systems that are more database-oriented than previous operating systems. For example, the Longhorn operating system expected to be released by Microsoft in 2006 includes an unstructured file system and a structured file system. The unstructured file system is the same NTFS file system included in Windows® 98 and Windows® 2000. The structured file system is a database-oriented file system in which file properties are stored and organized as structured database objects. When an application modifies unstructured properties of a file, structured database objects corresponding to the unstructured properties are updated. The process of updating the structured database objects is referred to as promotion. However, the promotion process only maps existing unstructured properties of the file to structured objects maintained by the structured file system. There is no ability in the promotion process to automatically associate data that is independent from a file with the structured objects or to selectively associate data with a file as metadata based on a file characteristic.

It may be desirable to allow users to define data and automatically associate, as metadata, the data with a resource, such as a file. In addition, it may be desirable to allow users to define rules that associate data with resources as metadata based on characteristics of the resources. Such capability would allow the user to organize files or other resources in an efficient manner. Because current file systems lack such capabilities, there exists a need for improved methods, systems, and computer program products for automatically associating data with a resource as metadata based on a characteristic of the resource.

SUMMARY

According to one aspect, the subject matter described herein includes a method for automatically associating data with a resource as metadata. The method includes defining a metadata association rule for a metadata associator. The metadata association rule maps a data value to the resource as metadata based on a characteristic of the resource in response to the resource being associated with the metadata associator. When the resource is associated with the metadata associator, the data value may be associated with a resource based on the metadata association rule. The specified data value may be defined prior to the resource being associated with the metadata associator and independently from a file system for storing the resource. For example, the specified data value may be user-defined text that is descriptive of the contents of the resource.

The subject matter described herein can be implemented as a computer program product comprising computer executable instructions embodied in a computer readable medium. Exemplary computer readable media suitable for implementing the subject matter described herein include disk memory devices, chip memory devices, application specific integrated circuits, and programmable logic devices. In addition, a computer program product that implements the subject matter described herein may be located on a single device or computing platform. Alternatively, the subject matter described herein can be implemented on a computer program product that is distributed across multiple devices or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
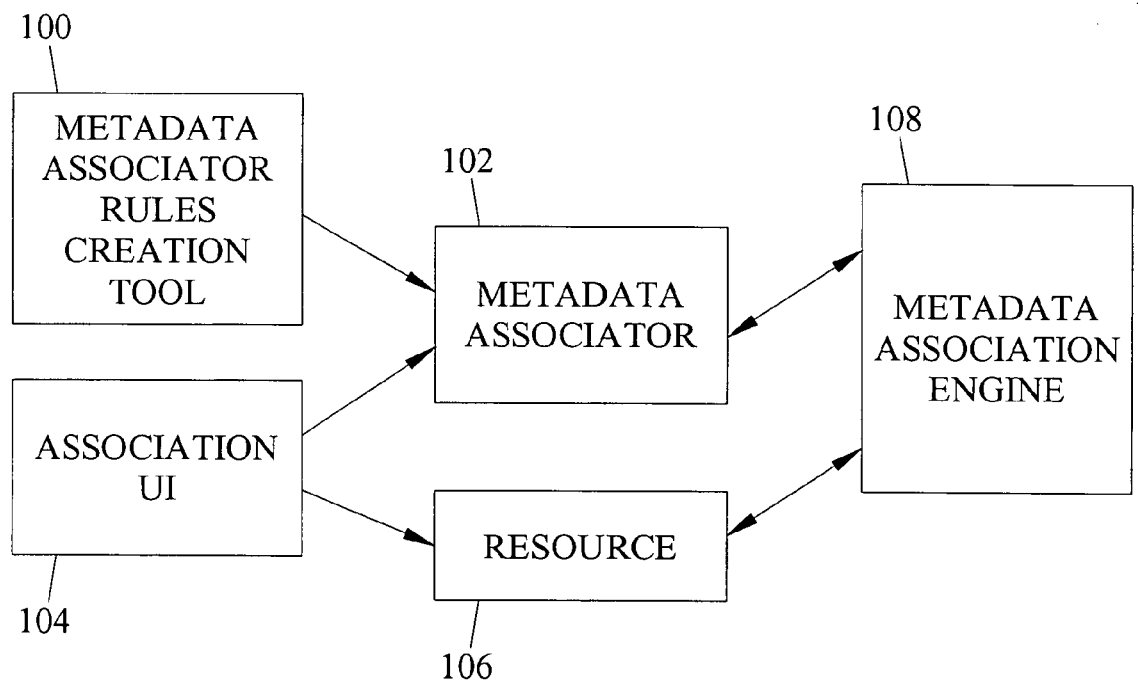
FIG. 1 is a block diagram illustrating an exemplary system for automatically associating data with a resource as metadata based on a characteristic of the resource according to an embodiment of the subject matter described herein.

According to one aspect, a system for automatically associating data with a resource as metadata based on a characteristic of the resource may be implemented as software components designed to execute on a general-purpose computing platform. FIG. 1 illustrates an example of a system for automatically associating data with a resource as metadata based on a characteristic of the resource according to an embodiment of the subject matter described herein. Referring to FIG. 1, the system includes means for defining a metadata association rule for a metadata associator where the metadata association rule specifies a data value to be associated with a resource as metadata based on a characteristic of the resource. For example, in FIG. 1, metadata association rules creation tool 100 allows a user to define a metadata association rule for a metadata associator 102. The metadata association rule may specify a resource characteristic and a mapping between the characteristic and data that will be associated with the resource as metadata when the resource is associated with metadata associator 102.

A metadata associator may be any suitable data structure capable of associating one or more metadata association rules with one or more resources. In one example, a metadata associator may be a file folder. In an alternate example, a metadata associator may be a smart folder. In another example, a metadata associator may be a database. In still an alternative example, a metadata associator may be a graphical representation, such as an icon, for performing the functions of the herein disclosed invention.

The system illustrated in FIG. 1 may also include means for associating at least one resource with metadata associator 102. For example, in FIG. 1, an association user interface 104 allows a user to associate resources, such as a resource 106, with metadata associator 102. Association user interface 104 may be any suitable user interface that allows resources, such as files or other data structures, to be associated with metadata associator 102. Exemplary association user interfaces that may be used are described in a commonly-assigned, co-pending U.S. patent application Ser. No. 11/238,708 entitled, "User Interfaces and Related Methods, Systems, and Computer Program Products for Automatically Associating Data with a Resource as Metadata," filed on even date herewith, the disclosure of which is incorporated herein by reference in its entirety.

The system illustrated in FIG. 1 may also include means for associating a data value with a resource as metadata based on the metadata association rule defined for the metadata associator. For example, in FIG. 1 metadata association engine 108 automatically associates data with resource 106 as metadata in response to resource 106 being associated with metadata associator 102. In order to associate data with resources as metadata, metadata association engine 108 may read the metadata association rule or rules defined for metadata associator 102 and associate resources having a given characteristic with the data specified by each rule. Associating the resource with the data specified by each rule may include storing the data within resource 106 or storing the data in a location that is outside of but linked to resource 106.

Figure 2:
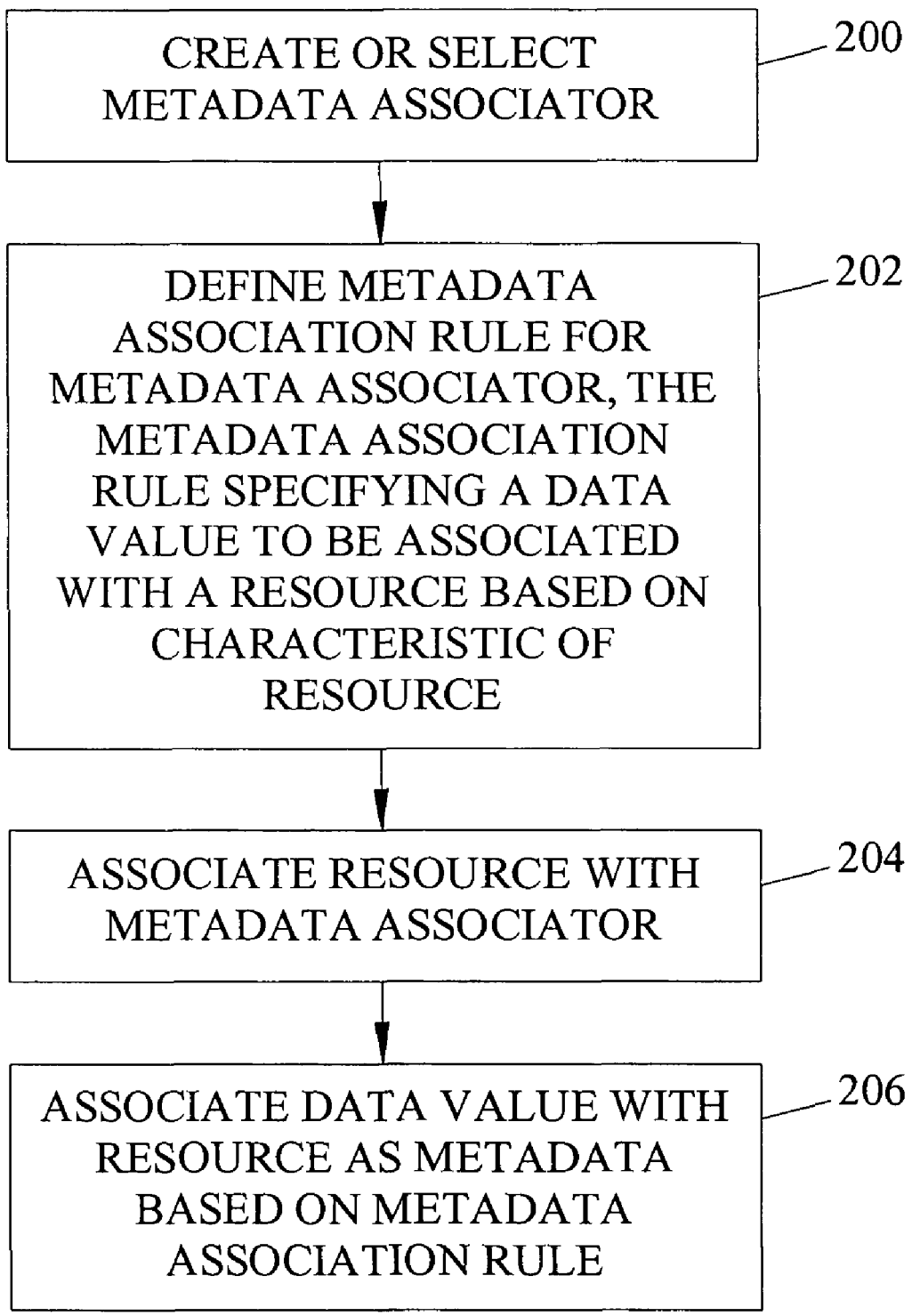
FIG. 2 is a flow chart illustrating an exemplary process for automatically associating data with a resource as metadata based on a characteristic of the resource according to an embodiment of the subject matter described herein.

FIG. 2 is a flow chart illustrating an exemplary process for automatically associating data with a resource as metadata based on a characteristic of the resource according to an embodiment of the subject matter described herein. Referring to FIG. 2, in block 200, a metadata associator is created or selected. This action specified by block 200 may be performed by a user using association user interface 104 illustrated in FIG. 1. For example, the user may create a file folder or select an existing file folder as the metadata associator.

Figure 3:
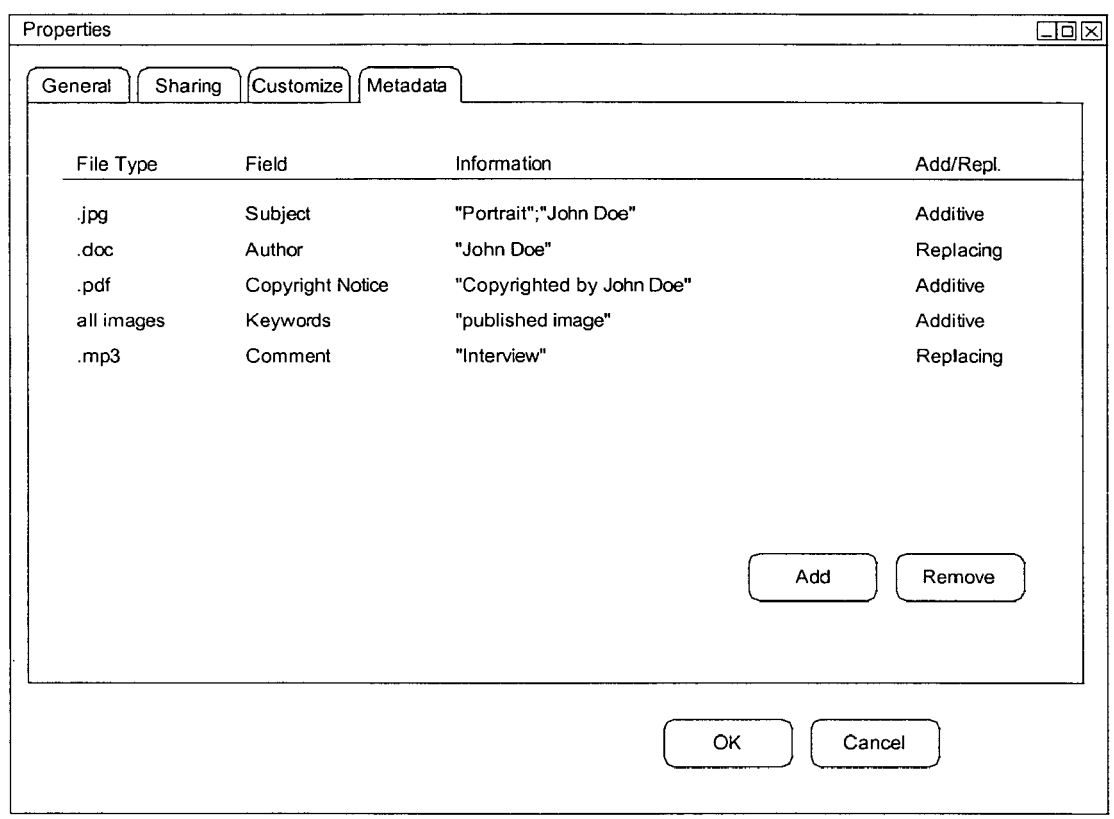
FIG. 3 is a diagram of an exemplary metadata association rules specification interface for displaying metadata association rules defined by a user according to an embodiment of the subject matter described herein.

In block 202, the user may define a metadata association rule for the metadata associator. The metadata association rule may specify a data value to be associated with a resource as metadata based on a characteristic of the resource. Defining a metadata association rule may be accomplished via a user interface provided by metadata association rules creation tool 100. FIG. 3 illustrates an exemplary user interface that may be associated with metadata association rules creation tool 100. Referring to FIG. 3, a rules specification interface 300 includes a user-editable table that stores metadata association rules that map resource characteristics to metadata tags and values. The table may be associated with a metadata associator, such as a file folder.

In the illustrated example, the resource characteristic being mapped to different metadata tags and values is file type. Each row in the table corresponds to a metadata association rule for a file type. Each rule includes an Information field that stores the data to be associated with the file type specified in the File Type field. Each rule also includes a Field field that stores the metadata tag with which the data in the Information field is to be associated. The metadata tags may be predefined, user-defined, or customizable.

Each rule in the table may further include an Additive/Replacing field that specifies whether the data to be associated with each file type is additive or replacing. A selection of "Additive" in the Additive/Replacing field means that the data in the Information field will be added to data currently stored in the tag specified in the Field field of the file. A selection of "Replacing" in the Additive/Replacing field means that the data in the Information field will replace any data currently associated with the tag specified in the Field field of the file.

Rules specification interface 300 may include Add and Remove buttons to allow a user to respectively add metadata association rules to the table and remove metadata association rules from the table. If the user selects the Add button, the user may be directed to a rules creation interface for creating a new metadata association rule. If the user selects the remove button and highlights one of the rules in the table, that rule may be removed from the table and thereby disassociated from the metadata associator for which it was created. Disassociating a rule from a metadata associator may trigger metadata association engine 108 to automatically disassociate metadata corresponding to the rule from the resources associated with the metadata associator when the rule is disassociated. Alternatively, disassociating a rule from a metadata associator may not trigger the disassociation of the corresponding metadata from resources associated with the metadata associator.

Instead, resources associated with the metadata associator prior to removal of the rule will retain their metadata, and the rule will not be applied to resources associated with the associator after removal of the rule. Adding or associating a rule with a previously created metadata associator may trigger metadata association engine 108 to automatically associate, as metadata, data corresponding to the rule with the resources previously associated with the metadata associator. Alternatively, adding or associating a rule with a previously created metadata associator may not trigger metadata association engine 108 to automatically associate, as metadata, data corresponding to the rule with the resources previously associated with the metadata associator.

Although in the description above for FIG. 3, it is indicated that each row in the table corresponds to a separate metadata association rule, the subject matter described herein is not limited to defining multiple separate metadata association rules for a metadata associator. In an alternate implementation, a user may define a single compound rule for a metadata associator that specifies different data to be associated with resources as metadata for resources having different characteristics.

Figure 4:
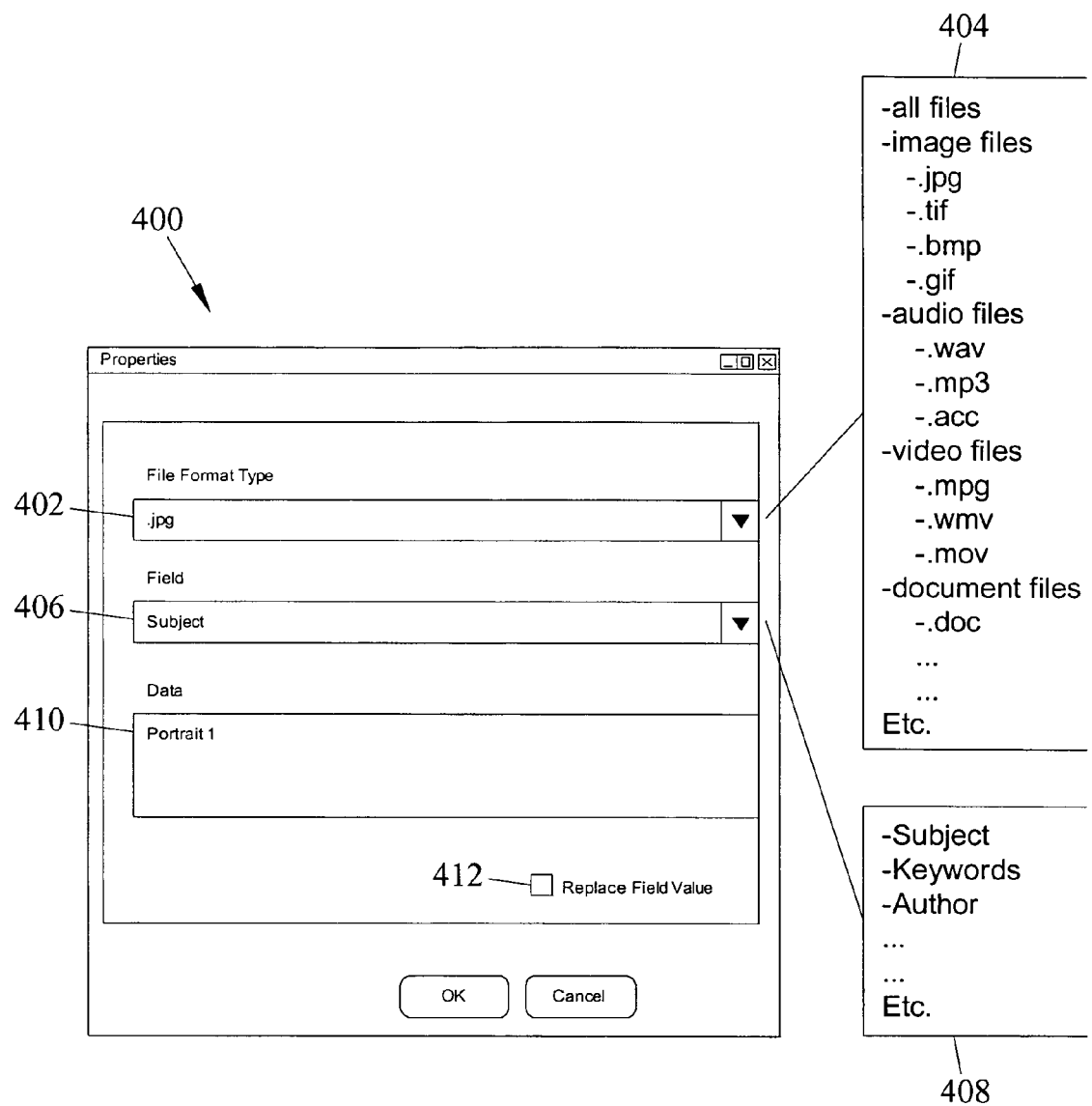
FIG. 4 is a diagram of an metadata rules creation interface for creating a metadata association rule to be displayed by the interface illustrated in FIG. 3 according to an embodiment of the subject matter described herein.

FIG. 4 is a diagram illustrating an exemplary rules creation interface that may be displayed when the user selects the Add button illustrated in FIG. 3. Referring to FIG. 4, a rules creation interface 400 may include a first input area 402 that allows a user to specify a resource characteristic. In the illustrated example, the resource characteristic is the file format type. Input area 402 may include a menu 404 listing valid file format types. A second input area 406 allows a user to specify the metadata tag affected by the metadata association rule. Input area 406 may include a menu 408 that lists metadata tags for the user to select. Input areas 402 and 406 may also allow a user to specify customized file format types and metadata tags that are not present in menus 404 and 408. Rules creation interface 400 may include a third input area 410 that allows a user to define data to be associated with the specified resource as metadata. A check box 412 allows the user to specify whether the metadata is additive or replacing.

Returning to FIG. 2, in block 204, the resource is associated with the metadata associator. For example, if the resource is a file folder, associating the resource with a metadata associator may include storing the file in the folder or otherwise associating the file with the folder. Exemplary methods for associating resources with metadata associators are described in the above-referenced commonly assigned, co-pending U.S. patent application. Briefly, these methods include dragging and dropping the resource onto the metadata associator using an input device, such as a mouse or a keyboard, dragging and hovering the resource over the metadata associator, or manually editing properties of the resource to associate the resource with the metadata associator.

In block 206, the data value is associated with the resource based on the metadata association rule. The action specified by block 206 may be implemented by metadata association engine 108 illustrated in FIG. 1. For example, metadata association engine 108 may read the rule or rules associated with the metadata associator, determine whether the resource has the characteristics specified by the rule, and, in response to determining that the resource has the characteristics specified by the rule, associate the corresponding metadata with the resource.

Figure 5:
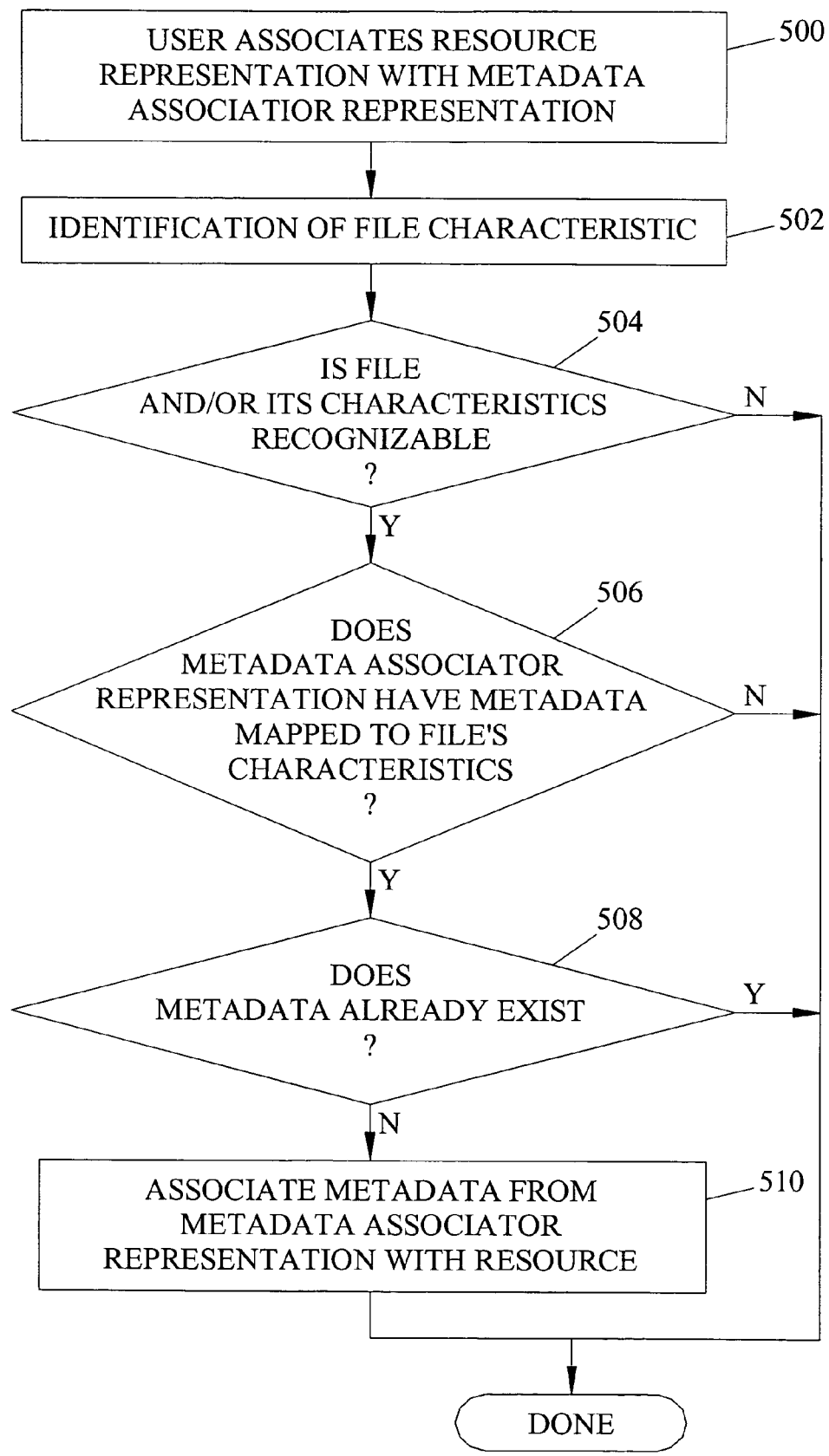
FIG. 5 is a flow chart illustrating an exemplary process for automatically associating data with a resource as metadata based on a characteristic of the resource according to an embodiment of the subject matter described herein.

FIG. 5 is a flow chart illustrating an exemplary process for automatically associating data with a metadata associator according to an embodiment of the subject matter described herein. The blocks illustrated in FIG. 5 provide additional detail to blocks 204 and 206 illustrated in FIG. 2. Referring to FIG. 5, in block 500, a user associates a resource representation with a metadata associator representation. In one exemplary implementation, the user may drag and drop the resource representation onto the metadata associator representation.

In block 502, the file characteristic defined for the rule or rules associated with the metadata associator is attempted to be identified. In block 504, it is determined whether the file and/or its characteristics are recognizable. The action specified by block 504 is optional and may be bypassed. If the file and/or its characteristics are recognizable, control proceeds to block 506 where it is determined whether the metadata associator representation has data values that map to the file's characteristics. Block 506 may include determining whether the characteristics specified by the rule or rules match the characteristics of the resource. If it is determined that the metadata associator representation has rules mapped to the file's characteristics, control proceeds to block 508 where it is determined whether the metadata already exists. If the metadata already exists, it may not be desirable to associate the resource with the metadata. The action specified by block 508 is optional and may be bypassed. In block 508, if it is determined that the metadata does not already exist, control proceeds to block 510 where data values from the metadata associator representation is associated with the resource as metadata.

Returning to block 504, if the file and/or its characteristics are unrecognizable, the metadata association process may end. Similarly, in block 506, if the metadata associator representation does not have a rule defined for the particular file's characteristics, the metadata association process ends. In block 508, if the metadata already exists, the metadata association process may end.

The subject matter described herein may be used to associate any type of data with a resource as metadata. Such data may include descriptive information regarding the contents of the resource, its creation, or any other data that the user desires to associate with the resource. Once the data is associated with the resource, the data may be classified as metadata, since it may be descriptive of data associated with the resource. The metadata may be intrinsic metadata, which describes the contents of the resource, or extrinsic metadata, which describes the implementation of a resource in an operating environment, such as a file system. For example, intrinsic metadata regarding a document file may include the title of the document. Extrinsic metadata regarding a document file may include the location of the document in a file system. Either or both types of metadata may be defined and associated with a metadata associator without departing from the scope of the subject matter described herein.

Metadata may be associated with the resource in any suitable manner. For example, the metadata may be stored within the resource or stored in a location that is separate from but associated with the resource. In one exemplary implementation, metadata may be stored in an instance of a database object linked to the resource. Metadata associated with a resource may be stored on the same computing platform or storage device as the resource or on a storage device or computing platform separate from the storage device or computing platform that stores the resource.

The subject matter described herein may be used to automatically associate, as metadata, data with metadata fields that are specified as part of a resource format specification, such as a file format specification. Alternatively, metadata associated with a resource may be extended using the resource description framework (RDF).

Metadata may be associated with smart folders. Smart folders are a new technology that automatically establishes a grouping of files or resources based on algorithms or rules. For example, a smart folder may be established for all files that use the word "elephant" in their text. The smart folder may automatically be populated with the relevant files by the file system. Any new file that is created or introduced to the file system and contains the word "elephant" will automatically become a member of the smart folder. The subject matter described herein may be used to automatically associate, as metadata, data with files that are associated with smart folders. For example, the subject matter described herein may associate the subject field of all resources that are associated with the elephant smart folder, and were created between two specified dates, with the word "elephant" or more descriptive user-specified text, such as, "trip to the zoo."

Because the subject matter described herein allows metadata to be selectively associated with a resource based on a characteristic of the resource, resources with different characteristics that are associated with the same metadata associator may be associated with different metadata. For example, files of different file format types may receive different metadata, even though the files are stored in the same folder. File characteristics other than file format type that may be used to determine the subset of data values associated with a file may include file size, creation date, and/or other characteristics without dependence on file type. Such selective metadata association can be contrasted with the operation performed by some conventional file systems of storing the same directory tree information in all files in a file folder, regardless of the file type or any other file characteristic.

In one example of how the file format type may be used to associate different files associated with the same folder with different metadata, a user may define a file folder named "furniture." The user may define a first metadata association rule for the furniture folder that specifies that all .pdf files in the folder have the keywords field being associated with "building instructions for Mission Furniture." The user may define in the same metadata association rule or in separate metadata association rule that all .jpg files stored in the folder have the subject metadata field associated with "furniture joint image". Such a folder would be useful if the user maintains or places into the folder pictures of mission style furniture as well as documents that describe how to build mission style furniture.

According to another aspect, the subject matter described herein may allow the user to create new customized metadata tags, in addition to populating existing tags. For example, in some file formats and some metadata schemes, users are permitted to create their own metadata tags or fields. The subject matter described herein may allow a user to create customized tags that are to be automatically associated with files having a certain characteristic when the files are associated with a particular metadata associator. For example, a user may create an <astrological sign> custom tag for a contact list of files or business card files. The user may also specify a definition of the custom tag or field that specifies the semantic meaning of the tag or field. Such a customized tag or field may be included in any of the metadata association rules that the user defines.

According to another aspect, the subject matter described herein allows a resource to be associated with more than one metadata associator. For example, a user may have a folder of resources all relating to a particular city and a separate folder of resources all relating to a particular person. In such an instance, a user may define a metadata association rule that associates a location tag to all the images in the city folder with "city name." Similarly, the user may specify that all images associated with a person-specific folder may have a subject tag corresponding to the person's name. If a file is associated with the city folder and the person-specific folder, the subject field of the file may be associated with "person's name" and the location field of the file may be associated with "city name." Accordingly, the subject matter described herein allows multiple metadata associators and association rules to be applied with a particular resource.

The subject matter described herein is not limited to defining metadata association rules that associate data with resources as metadata based on the file format type. Other characteristics may be used instead of or in addition to file format type in defining metadata association rules. One example of a characteristic that may be used includes the type of device that created a particular file. For example, all image files in a folder related to a user's vacation may have their respective subject fields associated with data that indicates the location of the vacation. Another metadata association rule that may be defined within the same folder may indicate that all images that were captured with a specific camera model that corresponds to an underwater camera may be associated with data that describes the dive or snorkeling site where the pictures were taken.

Another characteristic that may be used to selectively associate files with metadata according to the subject matter described herein is the time that a file was last accessed. For example, a user may define a metadata association rule that associates files that have not been accessed since a user-specified time with metadata that indicates that the files should be manually deleted or archived.

Yet another example of a characteristic that may be used to selectively associate data with resources as metadata includes access or security features of resources. For example, files having the word "confidential" or "private" may be automatically associated with metadata that indicates that the files are confidential or private, upon being associated with a metadata associator. Similarly, files that have been exposed to potential unauthorized viewing determined by differences in a resource's creation date and last accessed date may be associated with metadata indicating such post-creation access.

Yet another example of a resource characteristic that may be used to selectively associate data with files as metadata is file size. For example, files that have a size larger than 2 megabytes but smaller than 2.5 megabytes may be associated with a tag that indicates that the files contain image content. Such a characteristic may created by a user based on knowledge that only files associated with this particular associator in this range of file sizes contain image content.

The following scenarios illustrate examples of metadata that may be automatically associated with a resource based on resource characteristic according to embodiments of the subject matter described herein:

Scenario A:

i. Jim likes to keep digital copies of all of his receipts, be they paper receipts that were scanned or electronic receipts
ii. Jim has established a metadata associator with the following file-characteristic-based metadata association rules:

| Characteristic | Tag & Value |
|---|---|
| Creation Date.Year = 2005 | <Purchased (FY)> "2005" |
| CreationDate.Month = March ‖ 03 | <ExpensingMonth> "March" |
| . . . | . . . |
| . . . | . . . |

-continued

| | |
|---|---|
| FilePath = *\MyDocuments\Personal\* | <ExpenseType> "Personal" |
| FilePath = *\MyDocuments\Business\* | <ExpenseType> "Business" |
| IndexedKeyword = "Restaurant" \|\| "Café" | <ExpenseType> "Meal" |
| ALL FILES | <Subject> "Purchase Receipt" | iii. Every file that Jim associates with the metadata associator (via various methods, such as drag & drop techniques) will be associated with the metadata tags as described.
iv. These tags, in this instance, may reside in a sidecar file or as links to a database metadata element.

Scenario B:

i. Joe has a folder on his computer that contains files all relating to a particular bicycle design for the bicycle manufacturer with whom he is employed. The design is code-named "MetaCycle."
ii. The folder already contains at least one file.
iii. Joe accesses the metadata rules specification interface for that folder and chooses to add metadata association rules to that folder.
iv. Joe adds metadata association rules of the following nature, utilizing the interface's pull-down menus containing the file format types (as the file characteristic, in this case) and their relevant metadata mapping:

| File Type(s) | Field | Data |
|---|---|---|
| Images (.jpg, .png, etc) | <Subject> | "MetaCycle Prototype" |
| .jpg | <Location> | "Machine Shop" |
| .tif | <Location> | "Tradeshow" |
| .xls | <Subject> | "MetaCycle Specs" |
| .dwg | <Subject> | "MetaCycle Design Dwg" |
| All Files | <Project> | "MetaCycle" | v. Upon selecting to apply the above metadata mappings, the computer asks Joe if he would like to apply these metadata mappings to current and future files of this directory or just the future files.
vi. Joe selects "Current and Future." All of the current files in that folder are associated with the above-outlined metadata depending on the file format of each file.
vii. Joe adds files to this folder, and with each new file, the metadata defined above is associated with the file, depending on its file format type.

The subject matter described herein may be used to facilitate resource classification and organization. Exemplary uses of the subject matter described herein include enhancing resources with metadata that describe any one or more of the following items:

Different Uses:
Content of images (people, places, events; people already organize images into directories in this fashion).
Content of video (people, places, events).
Content of Audio (contains explicit language, fast tempo, etc).
Emotional indications of content (sad, happy, high-energy, depressing, etc)
Association with a particular project (name of project, urgency, importance, expensing, etc)

Enhancements

According to one enhancement, the subject matter described herein may be coupled with digital media organization software, such as digital camera software or digital music software to facilitate organization of image files or audio files. In addition, the subject matter described herein may be used with conventional directory-tree-based file systems or future file systems that are database oriented.

In a further enhancement, the subject matter described herein may determine whether duplicate metadata is associated with a resource before associating the metadata with the resource. For example, the data to be associated with a resource as metadata may be compared with metadata currently associated with the resource. If the data to be associated with the resource as metadata is equivalent to metadata currently associated with the resource, the metadata association engine may skip the particular data/metadata association as redundant. However, if it is determined that the data to be associated with the resource as metadata is not equivalent to metadata currently associated with the resource, the data may be associated with the resource as metadata.

Although the examples described above relate primarily to associating textual data with resources as metadata, the subject matter described herein is not limited to associating textual data with resources as metadata. Any data that is desired to be associated with a resource as metadata may be associated with a resource as metadata without departing from the scope of the subject matter described herein. Examples of non-textual data types that may be associated with a resource as metadata using the subject matter described herein include image data, video data, audio data, and/or non-image graphics data. Thus, the term "data value," as used herein refers to data of any one or more of these data types.

It will be understood that various details of the invention may be changed without departing from the scope of the invention. Furthermore, the foregoing description is for the purpose of illustration only, and not for the purpose of limitation.

What is claimed is:

1. A method for automatically associating data with a resource as metadata, the method comprising:
defining a metadata association rule for a metadata associator, the metadata association rule specifying a data value to be associated with a resource as metadata based on a characteristic of the resource, the data value defined independently from a file system with which the resource is associated;
providing a user interface for associating a resource with the metadata associator; and
in response to the resource being associated with the metadata associator via the user interface, associating the data value with the resource as metadata based on the metadata association rule, wherein an other resource having the same characteristic as the characteristic of the resource has a data value that is approximately the same as the data value of the resource, the other resource further having a different characteristic than the characteristic of the resource and having at least one different data value field or data value in which the data value is associated with the other resource as metadata in response to the other resource being associated with the metadata associator,
wherein associating the data value with the resource includes determining whether a metadata field associated with the resource with which the data value is to be associated contains data that is equivalent to the data value and associating the data value with the resource only in response to determining that the field does not contain data that is equivalent to the data value.

2. The method of claim 1 wherein the specified data value is defined prior to the resource being associated with the metadata associator.

3. The method of claim 1 wherein the specified data value is defined independently from the resource.

4. The method of claim 1 wherein the metadata association rule specifies different data values to be associated with resources as metadata in response to the resources having different characteristics.

5. The method of claim 1 further comprising associating the data value with resources previously associated with the metadata associator when the metadata association rule is defined.

6. The method of claim 1 comprising disassociating the metadata association rule from the metadata associator and, in response, automatically disassociating the data value from the resource.

7. The method of claim 1 comprising disassociating the metadata association rule from the metadata associator, and, in response, maintaining the association between the data value and the resource.

8. The method of claim 1 comprising associating the data value with resources associated with metadata associators that are associated with the metadata associator.

9. The method of claim 1 wherein defining a metadata association rule includes specifying the data value to be additive with respect to metadata values associated with the resource when the rule is defined.

10. The method of claim 1 wherein defining a metadata association rule includes specifying the data value to be replacing with respect to metadata values associated with the resource when the rule is defined.

11. The method of claim 1 wherein defining a metadata association rule includes specifying the data value to be associated with the resource using a resource description framework (RDF).

12. The method of claim 1 wherein associating the data value with the resource includes storing the data value within the resource.

13. The method of claim 1 wherein associating the data value with a resource includes storing the data value separately from the resource in a location or data structure linked to the resource.

14. The method of claim 1 wherein defining a metadata association rule includes creating a data tag to be associated with the resource as metadata.

15. The method of claim 1 comprising associating the resource with a plurality of metadata associators and associating corresponding data values with the resource as metadata based on metadata association rules defined for each of the metadata associators.

16. The method of claim 1 wherein the data value to be associated with the resource comprises a user-defined data value.

17. The method of claim 1 wherein the resource comprises a file and wherein automatically associating a data value with the resource as metadata includes associating a data value with the file based on a file format type of the file.

18. The method of claim 1 wherein the resource comprises a file and wherein automatically associating a data value with a resource as metadata includes associating the data value with the file as metadata based on content of the file.

19. The method of claim 1 wherein the resource comprises a file and wherein automatically associating a data value with the resource as metadata includes associating a data value with the file based on a file creation date for the file.

20. The method of claim 1 wherein the resource comprises a file and wherein automatically associating a data value with the resource as metadata includes associating a data value with the file based on a file creation device used to create content associated with the file.

21. The method of claim 1 wherein the resource comprises a file and wherein automatically associating a data value with the resource as metadata includes associating a data value with the file, the data value indicating that the file should be deleted or archived based on a time that the file was last accessed.

22. The method of claim 1 wherein the resource comprises a file and wherein automatically associating a data value with the resource as metadata includes, in response to determining that a file has been exposed to potential unauthorized viewing, associating a data value with the file, the data value indicating that the file has been exposed to potential unauthorized viewing.

23. The method of claim 1 wherein the resource comprises a file and wherein automatically associating a data value with the resource as metadata includes associating, based on predetermined content being present in the file, a data value indicating a security level of the file.

24. The method of claim 1 wherein the resource comprises a file and wherein automatically associating a data value with the file as metadata includes automatically associating, in response to determining that the file has a predetermined size known to a user to be indicative of contents of the file, a data value with the file indicative of the contents of the file.

25. The method of claim 1 wherein the metadata associator comprises a file folder.

26. The method of claim 1 wherein the metadata associator comprises a smart folder.

27. The method of claim 1 wherein the metadata associator comprises a database.

28. A computer system for automatically associating data with a resource as metadata, the system comprising:
at least one hardware device including components comprising:
a metadata association rules creation tool configured to create a metadata association rule specifying a data value to be associated with a resource as metadata based on a characteristic of the resource, the data value defined independently from a file system with which the resource is associated; and
a metadata association engine configured to, using the metadata association rule, automatically associate the data value with a resource as metadata in response to the resource being associated with the metadata associator, wherein an other resource having the same characteristic as the characteristic of the resource has a data value that is approximately the same as the data value of the resource, the other resource further having a different characteristic than the characteristic of the resource and having at least one different data value field or data value in which the data value is associated with the other resource as metadata in response to the other resource being associated with the metadata associator,
wherein the metadata association engine is configured to determine whether a metadata field associated with the resource with which the data value is to be associated contains data that is equivalent to the data value and to associate the data value with the resource only in response to determining that the metadata field does not contain data that is equivalent to the data value.

29. The system of claim 28 wherein the data value specified by the metadata association rule is defined prior to the resource being associated with the metadata associator.

30. The system of claim 28 wherein the data value specified by the metadata association rule is defined independently from the resource.

31. The system of claim 28 wherein the metadata association engine is configured to automatically associate the data value with resources previously associated with the metadata associator when the metadata association rule is defined.

32. The system of claim 28 wherein the metadata association rules creation tool includes a rules creation interface for receiving input as to whether the metadata association rule is to be applied to at least one of resources associated with the metadata associator when the metadata association rule is defined and resources associated with the metadata associator after the metadata association rule is defined.

33. The system of claim 28 wherein the metadata association engine is configured to automatically disassociate the data value from the resource in response to the metadata association rule being disassociated from the metadata associator.

34. The system of claim 28 wherein the metadata association engine is configured to retain the association between the data value and the resource in response to the metadata association rule being disassociated from the metadata associator.

35. The system of claim 28 wherein the metadata association rules creation tool is configured to allow a user to specify metadata values to be associated with a resource in a resource description framework (RDF).

36. The system of claim 28 wherein the metadata association engine is configured to embed the data value in the resource.

37. The system of claim 28 wherein the metadata association engine is configured to store the data value in a location or data structure separate from but linked to the resource.

38. The system of claim 28 wherein the metadata association rules creation tool includes an interface for receiving a data tag and wherein the metadata association engine is configured to automatically associate the data tag as metadata with the resource in response to the resource being associated with the metadata associator.

39. The system of claim 38 wherein the data tag comprises a user-defined tag.

40. The system of claim 28 comprising an association user interface for allowing a user to associate the resource with a plurality of metadata associators and wherein the metadata association engine is configured to associate corresponding data defined for each of the metadata associators with the resource.

41. The system of claim 28 wherein the resource comprises a file.

42. The system of claim 41 wherein the data value is selected based on a file format type of the file.

43. The system of claim 41 wherein the data value is selected based on contents of the file.

44. The system of claim 41 wherein the data value is selected based on a file creation date of the file.

45. The system of claim 41 wherein the data value is selected based on a file creation device used to create the file.

46. The system of claim 41 wherein the data value indicates that the file should be deleted or archived and wherein the characteristic comprises a time that the file was last accessed.

47. The system of claim 41 wherein the data value indicates that the file has been exposed to potential unauthorized viewing and wherein the characteristic includes a condition that the file has been exposed to potential unauthorized viewing.

48. The system of claim 41 wherein the data value is selected based on the file having a predetermined size.

49. The system of claim 28 wherein the metadata association rule specifies different data values to be associated as metadata with resources having different characteristics.

50. A computer system for automatically associating data with a resource as metadata, the system comprising:
a processor; a memory comprising:
means for defining a metadata association rule for a metadata associator, the metadata association rule specifying a data value to be associated with a resource as metadata based on a characteristic of the resource, the data value defined independently from a file system with which the resource is associated;
means for receiving user input for associating at least one resource with the metadata associator; and
means for, in response to a resource being associated with the metadata associator, associating the data value with the resource as metadata based on the metadata association rule, wherein an other resource having the same characteristic as the characteristic of the resource has a data value that is approximately the same as the data value of the resource, the other resource further having a different characteristic than the characteristic of the resource and having at least one different data value field or data value in which the data value is associated with the other resource as metadata in response to the other resource being associated with the metadata associator,
wherein associating the data value with the resource includes determining whether a metadata field associated with the resource with which the data value is to be associated contains data that is equivalent to the data value and associating the data value with the resource only in response to determining that the field does not contain data that is equivalent to the data value.

51. A computer program product comprising computer executable instructions embodied in a computer readable storage medium for performing steps comprising:
defining a metadata association rule for a metadata associator, the metadata association rule specifying a data value to be associated with a resource as metadata based on a characteristic of the resource, the data value defined independently from a file system with which the resource is associated;
providing a user-interface for associating a resource with the metadata associator; and
in response to the resource being associated with the metadata associator via the user-interface, associating the data value with the resource as metadata based on the metadata association rule, wherein an other resource having the same characteristic as the characteristic of the resource has a data value that is approximately the same as the data value of the resource, the other resource further having a different characteristic than the characteristic of the resource and having at least one different data value field or data value in which the data value is associated with the other resource as metadata in response to the other resource being associated with the metadata associator,
wherein associating the data value with the resource includes determining whether a metadata field associated with the resource with which the data value is to be associated contains data that is equivalent to the data value and associating the data value with the resource only in response to determining that the field does not contain data that is equivalent to the data value.

* * * * *